(12) United States Patent
Moon et al.

(10) Patent No.: US 10,297,397 B2
(45) Date of Patent: May 21, 2019

(54) N-DOPED THREE DIMENSIONAL CARBON NANOSTRUCTURE, METHOD OF PREPARING THE SAME, AND SUPERCAPACITOR ELECTRODE INCLUDING THE SAME

(71) Applicant: Sogang University Research & Business Development Foundation, Seoul (KR)

(72) Inventors: Jun Hyuk Moon, Seoul (KR); Dayoung Kang, Incheon (KR); Cheol Ho Kim, Iksan-si (KR); Gyurim Park, Paju-si (KR)

(73) Assignee: SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 0 days.

(21) Appl. No.: 15/598,778

(22) Filed: May 18, 2017

(65) Prior Publication Data
US 2017/0338057 A1 Nov. 23, 2017

(30) Foreign Application Priority Data
May 20, 2016 (KR) .................. 10-2016-0062207

(51) Int. Cl.
| | | |
|---|---|---|
| *H01G 11/36* | (2013.01) | |
| *H01G 11/86* | (2013.01) | |
| *H01G 9/00* | (2006.01) | |
| *B82Y 30/00* | (2011.01) | |
| *H01G 9/15* | (2006.01) | |
| *C01B 32/05* | (2017.01) | |

(52) U.S. Cl.
CPC ............ *H01G 11/36* (2013.01); *C01B 32/05* (2017.08); *H01G 9/15* (2013.01); *H01G 11/86* (2013.01); *B82Y 30/00* (2013.01); *C01P 2002/82* (2013.01); *C01P 2004/03* (2013.01); *C01P 2004/30* (2013.01)

(58) Field of Classification Search
CPC ................................. H01G 11/36; H01G 9/15
See application file for complete search history.

(56) References Cited

FOREIGN PATENT DOCUMENTS

| KR | 20130034181 A | 4/2013 |
|---|---|---|
| KR | 101356791 B1 | 1/2014 |
| KR | 20140021275 A | 2/2014 |
| KR | 10-1473752 B1 | 12/2014 |
| KR | 101485867 B1 | 1/2015 |

OTHER PUBLICATIONS

Wei et al., "Nitrogen-Doped Carbon Nanotube and Graphene Materials for Oxygen Reduction Reactions", Catalysts, vol. 5, pp. 1574-1602, Sep. 14, 2015.
Office Action dated Sep. 11, 2017 in KR Application No. 10-2016-0062207.
Kang et al, "Liquid Immersion Thermal Crosslinking of 3D Polymer Nanopatterns for Direct Carbonisation with High Structural Integrity," Scientific Reports, vol. 5, pp. 1-8 (2015).

*Primary Examiner* — Seahvosh Nikmanesh
(74) *Attorney, Agent, or Firm* — Panitch Schwarze Bellisario & Nadel LLP

(57) ABSTRACT

Disclosed are an N-doped three dimensional carbon nanostructure, a method of preparing the N-doped three dimensional carbon nanostructure, and a supercapacitor electrode including the three dimensional carbon nanostructure.

3 Claims, 19 Drawing Sheets

EXPOSURE OF 5-BEAM INTERFERENCE PATTERN ONTO SU8 PHOTORESIST

POST-EXPOSURE BAKING & DEVELOPMENT

THREE DIMENSIONAL POROUS POLYMER PATTERN

N-DOPED THREE DIMENSIONAL CARBON NANOSTRUCTURE, METHOD OF PREPARING THE SAME, AND SUPERCAPACITOR ELECTRODE INCLUDING THE SAME

CROSS-REFERENCE TO RELATED APPLICATION

This application claims the benefit under 35 USC 119(a) of Korean Patent Application No. 10-2016-0062207 filed on May 20, 2016, in the Korean Intellectual Property Office, the entire disclosure of which is incorporated herein by reference for all purposes.

TECHNICAL FIELD

The present disclosure relates to a nitrogen (N)-doped three dimensional carbon nanostructure, a method of preparing the N-doped three dimensional carbon nanostructure, and a supercapacitor electrode including the three dimensional carbon nanostructure.

BACKGROUND

Direct carbonization of polymer materials has been widely verified as a method for preparing carbon materials. The advantage of this approach is that it can obtain various forms of carbon using various polymer materials or patterns (e.g., block copolymer assemblies, patterns, or polymer spheres) as a precursor. Further, compared with using soft or hard templates for fabrication of porous carbon, the direct carbonization is more simple and easy. Specifically, the carbonization of photoresist polymer patterns is well established and enables a lithography-based design of carbon materials which is one of the highly delicate microfabrication techniques. The fabrication of micropatterned carbons has been successfully demonstrated and has led to new applications of carbon materials in MEMS, electrochemical sensors and energy devices.

Polymer carbonization is typically processed at high temperatures (usually 500° C. or more) to induce pyrolytic reduction of the polymers into carbonaceous materials. This high-temperature treatment of polymer patterns may result in the following problems. (1) Firstly, the polymer may flow, for example, at a glass transition temperature ($T_g$) of the polymer or higher and the polymer pattern morphology can be changed to lower the surface energy, which makes it difficult to obtain a desired carbon pattern. (2) Further, a large mass loss during carbonization at a high temperature may also lead the shrinkage of the macroscopic morphology of the produced carbon. Conventionally, such macroscopic morphology changes were reported less frequently. This may be mostly attributed to the use of template materials for fabrication of porous structures. The template maintains the structure during the carbonization. Moreover, most of the lithography-patterned polymer patterns used for direct carbonization are thin and film-like. In this case, strong adhesion with a substrate may resist macroscopic pattern change during carbonization. However, an attempt to utilize polymer films with high-aspect-ratio or high-specific-area patterns (e.g., three dimensional or porous patterned film) in direct carbonization may be more likely to encounter this problem. For example, a photoresist polymer pattern with a three dimensional pore network and submicrometer features was prepared and the morphology thereof during a heat treatment was investigated. It was found that the polymer patterns flowed out and then induced pore collapse at only 150° C. (much lower than the carbonization temperature), resulting in pattern-collapsed carbon films. Therefore, a method for improving the thermal stability of polymer patterns may first be required to maintain the structural integrity during the direct carbonization.

Korean Patent No. 10-1356791 discloses a film-type supercapacitor and a method of fabricating the same.

SUMMARY

In view of the foregoing, the present disclosure provides an N-doped three dimensional carbon nanostructure, a method of preparing the N-doped three dimensional carbon nanostructure, and a supercapacitor electrode including the three dimensional carbon nanostructure.

However, problems to be solved by the present disclosure are not limited to the above-described problem. Although not described herein, other problems to be solved by the present disclosure can be clearly understood by those skilled in the art from the following descriptions.

In accordance with a first aspect of the present disclosure, there is provided a method of preparing an N-doped three dimensional carbon nanostructure, including: a step of preparing a three dimensional porous polymer pattern; a step of solution-heating the three dimensional porous polymer pattern; and a step of calcining the solution-heated three dimensional porous polymer pattern with a nitrogen source to simultaneously perform carbonization and nitrogen doping so as to obtain an N-doped three dimensional carbon nanostructure.

In accordance with a second aspect of the present disclosure, there is provided an N-doped three dimensional carbon nanostructure having a nitrogen doping ratio of 10% or more.

In accordance with a third aspect of the present disclosure, there is provided a supercapacitor electrode including the N-doped three dimensional carbon nanostructure according to the first aspect of the present disclosure.

In accordance with an embodiment of the present disclosure, a three dimensional porous polymer pattern formed by interference lithography can be improved in crosslinking degree by using a solution-heating method, and an N-doped three dimensional carbon nanostructure can be prepared by calcining the three dimensional porous polymer pattern with a nitrogen source.

The N-doped three dimensional carbon nanostructure in accordance with an embodiment of the present disclosure does not include an inorganic layer, so that a preparing process can be shortened as compared with an N-doped three dimensional carbon nanostructure formed by a conventional chemical vapor deposition method. Also, the N-doped three dimensional carbon nanostructure in accordance with an embodiment of the present disclosure has excellent capacitance properties and thus can be applied as an electrode material for supercapacitor having a high capacitance.

DETAILED DESCRIPTION

Figure 1:
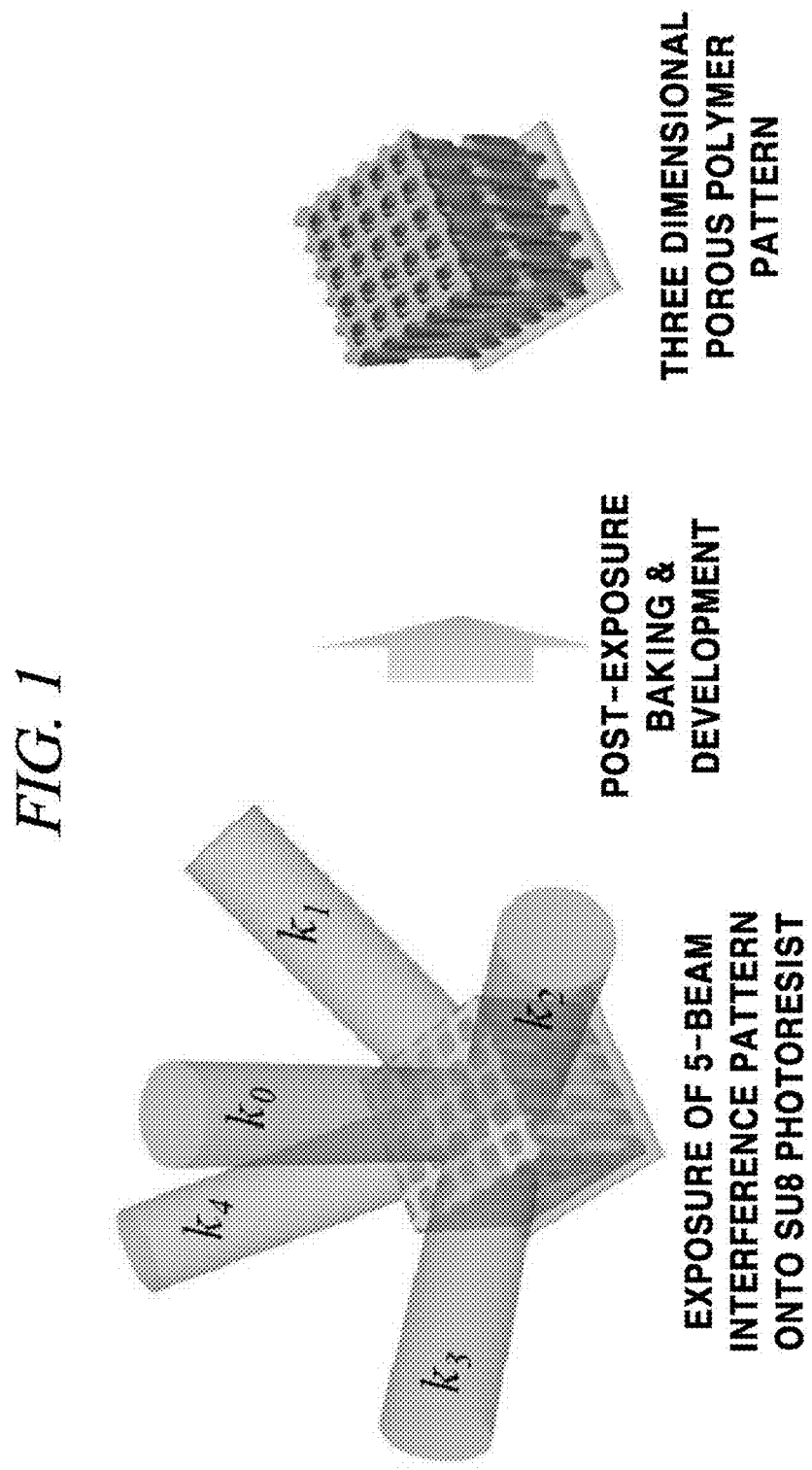
FIG. 1 is a schematic diagram illustrating a multi-beam lithography process for preparing a three dimensional porous polymer pattern in an embodiment of the present disclosure.

Hereinafter, examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically or electrostatically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "graphene" refers to a material forming a polycyclic aromatic molecule with multiple carbon atoms covalently bonded to each other. The covalently bonded carbon atoms form a six-member ring as a repeating unit, but can further include a five-member ring and/or a seven-member ring. Therefore, a sheet formed of the graphene may be seen as a single layer of carbon atoms covalently bonded to each other, but may not be limited thereto. The sheet formed of the graphene may have various structures depending on a content of five-member ring and/or a seven-member ring which may be contained in the graphene. Further, if the sheet formed of the graphene is formed into a single layer, such a single layer may be stacked to form multiple layers and a side end portion of the graphene sheet may be saturated with a hydrogen atom, but may not be limited thereto.

Through the whole document, the term "graphene oxide" may be abbreviated as "GO", and may include a structure in which a functional group containing oxygen such as a carboxyl group, a hydroxyl group, or an epoxy group is bonded to a single layer of graphene, but may not be limited thereto.

Through the whole document, the term "reduced graphene oxide" refers to graphene oxide decreased in a percentage of oxygen through a reduction process and may be abbreviated as "rGO", but may not be limited thereto.

Hereinafter, embodiments and examples of the present disclosure will be described in detail with reference to the accompanying drawings. However, the present disclosure may not be limited to the following embodiments and examples.

In accordance with a first aspect of the present disclosure, there is provided a method of preparing an N-doped three dimensional carbon nanostructure, including: a step of preparing a three dimensional porous polymer pattern; a step of solution-heating the three dimensional porous polymer pattern; and a step of calcining the solution-heated three dimensional porous polymer pattern with a nitrogen source to simultaneously perform carbonization and nitrogen doping so as to obtain an N-doped three dimensional carbon nanostructure.

In an embodiment of the present disclosure, the three dimensional porous polymer pattern can be explained with reference to FIG. 1. Firstly, the three dimensional porous polymer pattern may be formed by a process including: forming a photoresist layer by spin-coating a photoresist solution on a substrate; forming a three dimensional porous photoresist polymer pattern by irradiating a three dimensional optical interference pattern onto the formed photoresist layer by three dimensional optical interference lithography; and obtaining a three dimensional porous polymer pattern by performing a heat treatment to the substrate to which the three dimensional optical interference pattern is irradiated, washing the substrate, and developing the photoresist pattern, but may not be limited thereto.

In an embodiment of the present disclosure, the step of solution-heating the three dimensional porous polymer pattern may include dipping the three dimensional porous polymer pattern in a solution containing an organic solvent, followed by heat treatment, and then washing the solution remaining on the surface of the porous polymer pattern, but may not be limited thereto.

In an embodiment of the present disclosure, the solution-heating may be performed at a glass transition temperature of the polymer or higher, but may not be limited thereto.

In an embodiment of the present disclosure, the solution-heating may be performed at a temperature ranging from about 100° C. to about 200° C., but may not be limited thereto. For example, the solution-heating may be performed at a temperature ranging from about 100° C. to about 200° C., from about 100° C. to about 180° C., from about 100° C. to about 170° C., from about 100° C. to about 150° C., from about 100° C. to about 130° C., from about 130° C. to about 200° C., from about 130° C. to about 180° C., from about 130° C. to about 170° C., from about 130° C. to about 150° C., from about 150° C. to about 200° C., from about 150° C. to about 180° C., from about 150° C. to about 170° C., from about 170° C. to about 200° C., from about 170° C. to about 180° C., from about 180° C. to about 200° C., or from about 100° C. to about 130° C., but may not be limited thereto.

In an embodiment of the present disclosure, the organic solvent may not dissolve the polymer, but may not be limited thereto. For example, the organic solvent may include an organic solvent which has a relative energy difference (RED) number based on the Hansen solubility parameter with respect to the polymer is less than about 1.0, and may include hexadecane or silicone oil, but may not be limited thereto.

In an embodiment of the present disclosure, the three dimensional porous polymer pattern or the three dimensional carbon nanostructure may include three dimensionally arranged pores, but may not be limited thereto.

In an embodiment of the present disclosure, the calcining may be performed at a temperature ranging from about 700° C. or more, but may not be limited thereto. For example, the calcining may be performed at a temperature ranging from about 700° C. or more, from about 700° C. to about 1,500° C., from about 700° C. to about 1,300° C., from about 700° C. to about 1,100° C., from about 700° C. to about 900° C., from about 900° C. to about 1,500° C., from about 900° C. to about 1,300° C., from about 900° C. to about 1,100° C., from about 1,100° C. to about 1,500° C., from about 1,100° C. to about 1,300° C., or from about 1,300° C. to about 1,500° C., but may not be limited thereto.

In an embodiment of the present disclosure, the calcination temperature may control a nitrogen doping ratio or bonding of doped nitrogen, but may not be limited thereto. For example, the types of the bonding of doped nitrogen may include pyridine-like, pyrrole-like, graphite-nitrogen, or nitrogen oxide, but may not be limited thereto.

In an embodiment of the present disclosure, the nitrogen source may be used without limitation as long as it includes nitrogen, and may include, for example, a member selected from the group consisting of amines, imines, nitriles, pyrroles, diazoles, triazoles, pyridines, diazines, triazines, and derivatives thereof, but may not be limited thereto. For example, the nitrogen source may include melamine, ureas, pyridines, pyrroles, polyacrylonitriles, ethylene-diaminetetraacetic acid, ammonia, ammonium chloride, triethylamine, or diethylamine, but may not be limited thereto.

Figure 2:
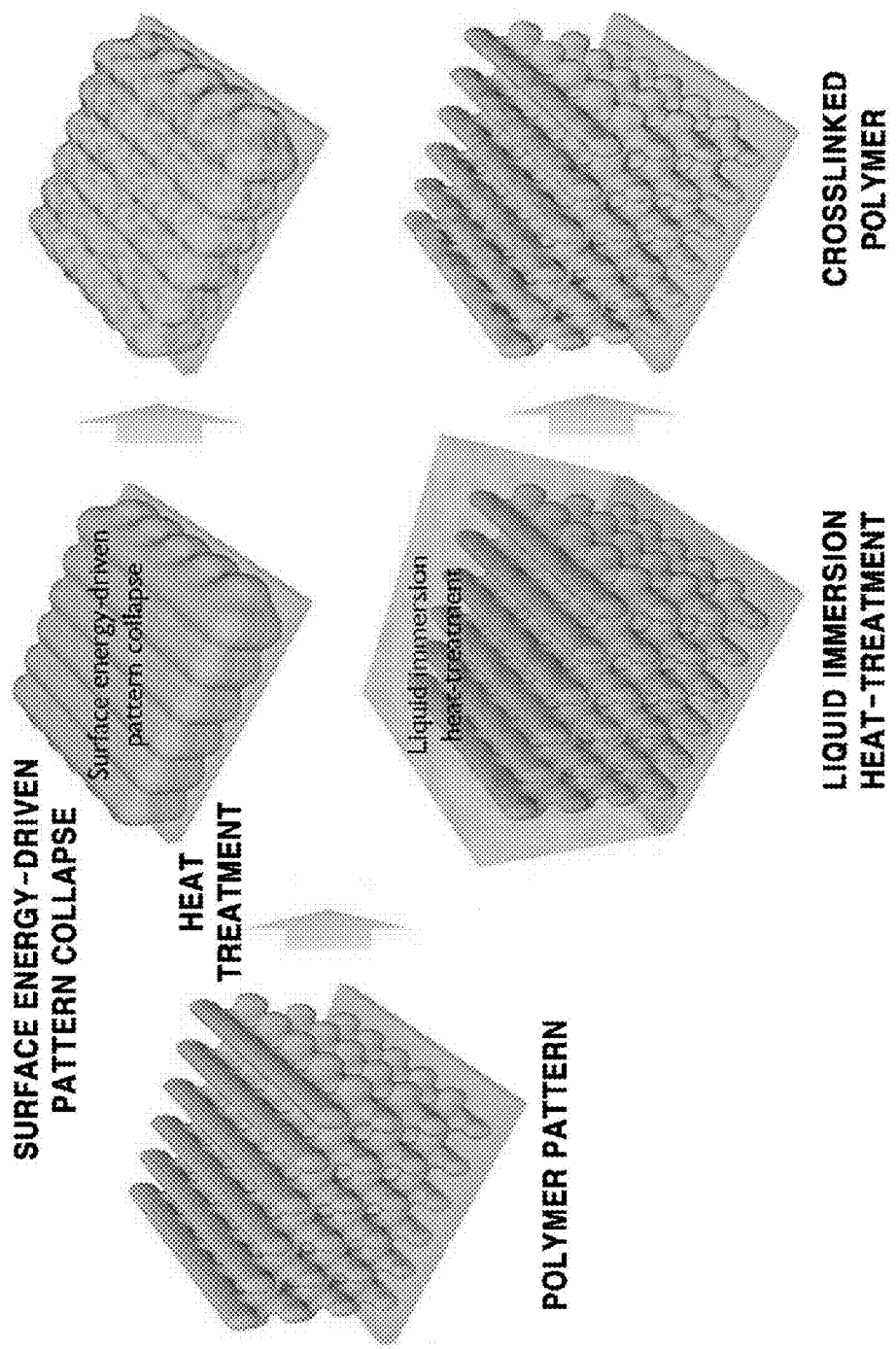
FIG. 2 is a schematic diagram illustrating solution-heating for thermal crosslinking of a three dimensional porous polymer pattern in an embodiment of the present disclosure.

FIG. 2 is a diagram comparing a conventional three dimensional carbon nanostructure prepared without solution-heating and a three dimensional carbon nanostructure according to the present disclosure. As shown in FIG. 2, it can be seen that in the three dimensional carbon nanostructure prepared without solution-heating, the pattern collapses during a carbonization process, whereas in the three dimensional carbon nanostructure according to the present disclosure, the structural integrity of the pattern is maintained.

In accordance with a second aspect of the present disclosure, there is provided an N-doped three dimensional carbon nanostructure having a nitrogen doping ratio of 10% or more. For example, the N-doped three dimensional carbon nanostructure may be prepared by performing solution-heating to a three dimensional porous polymer pattern using an organic solvent and carbonizing the three dimensional porous polymer pattern with a nitrogen source. Thus, the N-doped three dimensional carbon nanostructure may have an improved nitrogen doping ratio. The nitrogen doping ratio of the N-doped three dimensional carbon nanostructure may be about 10% or more, about 12% or more, about 15% or more, from about 10% to about 15%, or from about 10% to about 20%, but may not be limited thereto.

In an embodiment of the present disclosure, the N-doped three dimensional carbon nanostructure may be prepared by the method according to the first aspect of the present disclosure, but may not be limited thereto. For example, the N-doped three dimensional carbon nanostructure may be prepared by a step of preparing a three dimensional porous polymer pattern; a step of solution-heating the three dimensional porous polymer pattern; and a step of calcining the solution-heated three dimensional porous polymer pattern with a nitrogen source to simultaneously perform carbonization and nitrogen doping so as to obtain an N-doped three dimensional carbon nanostructure.

In an embodiment of the present disclosure, the three dimensional porous polymer pattern may be formed by a process including: forming a photoresist layer by spin-coating a photoresist solution on a substrate; forming a three dimensional porous photoresist polymer pattern by irradiating a three dimensional interference pattern onto the formed photoresist layer by three dimensional interference lithography; and obtaining a three dimensional porous polymer pattern by performing a heat treatment to the substrate to which the three dimensional interference pattern is irradiated, washing the substrate, and developing the photoresist pattern, but may not be limited thereto.

In an embodiment of the present disclosure, the step of solution-heating the three dimensional porous polymer pattern may include dipping the three dimensional porous polymer pattern in a solution containing an organic solvent, followed by heat treatment, and then washing the solution remaining on the surface of the porous polymer pattern, but may not be limited thereto.

In an embodiment of the present disclosure, the solution-heating may be performed at a glass transition temperature of the polymer or higher, but may not be limited thereto.

In an embodiment of the present disclosure, the solution-heating may be performed at a temperature ranging from about 100° C. to about 200° C., but may not be limited thereto. For example, the solution-heating may be performed at a temperature ranging from about 100° C. to about 200° C., from about 100° C. to about 180° C., from about 100° C. to about 170° C., from about 100° C. to about 150° C., from about 100° C. to about 130° C., from about 130° C. to about 200° C., from about 130° C. to about 180° C., from about 130° C. to about 170° C., from about 130° C. to about 150° C., from about 150° C. to about 200° C., from about 150° C. to about 180° C., from about 150° C. to about 170° C., from about 170° C. to about 200° C., from about 170° C. to about 180° C., from about 180° C. to about 200° C., or from about 100° C. to about 130° C., but may not be limited thereto.

In an embodiment of the present disclosure, the organic solvent may not dissolve the polymer, but may not be limited thereto. For example, the organic solvent may include an organic solvent which has a relative energy difference (RED) number based on the Hansen solubility parameter with respect to the polymer is less than about 1.0, and may include hexadecane or silicone oil, but may not be limited thereto.

In an embodiment of the present disclosure, the three dimensional porous polymer pattern or the three dimensional carbon nanostructure may include three dimensionally arranged pores, but may not be limited thereto.

In an embodiment of the present disclosure, the calcining may be performed at a temperature ranging from about 700° C. or more, but may not be limited thereto. For example, the calcining may be performed at a temperature ranging about 700° C. or more, from about 700° C. to about 1,500° C., from about 700° C. to about 1,300° C., from about 700° C. to about 1,100° C., from about 700° C. to about 900° C., from about 900° C. to about 1,500° C., from about 900° C. to about 1,300° C., from about 900° C. to about 1,100° C., from about 1,100° C. to about 1,500° C., from about 1,100° C. to about 1,300° C., or from about 1,300° C. to about 1,500° C., but may not be limited thereto.

In an embodiment of the present disclosure, the nitrogen source may be used without limitation as long as it includes nitrogen, and may include, for example, a member selected from the group consisting of amines, imines, nitriles, pyrroles, diazoles, triazoles, pyridines, diazines, triazines, and derivatives thereof, but may not be limited thereto. For example, specifically, the nitrogen source may include melamine, ureas, pyridines, pyrroles, polyacrylonitriles, ethylene-diaminetetraacetic acid, ammonia, ammonium chloride, triethylamine, or diethylamine, but may not be limited thereto.

In an embodiment of the present disclosure, the three dimensional carbon nanostructure may have a wood-pile pattern, a face-centered-cubic (FCC) pattern, a thin-skeleton wood-pile pattern, and the like, but may not be limited thereto. For example, a three dimensional carbon nanostructure having an FCC pattern can be prepared by using 4-beam interference lithography and a three dimensional carbon nanostructure having a wood-pile pattern or a thin-skeleton wood-pile pattern can be prepared by using 5-beam interference lithography. Even if a three dimensional porous polymer pattern as described above has small pores or a thin skeleton, a crosslinking degree of the polymer can be increased by using the solution-heating of the present disclosure, so that the three dimensional porous polymer pattern can be carbonized.

In accordance with a third aspect of the present disclosure, there is provided a supercapacitor electrode including the N-doped three dimensional carbon nanostructure according to the first aspect of the present disclosure. Detailed descriptions of parts of the supercapacitor electrode according to the third aspect of the present disclosure, which overlap with those of the first aspect of the present disclosure, are omitted hereinafter, but the descriptions of the first aspect of the present disclosure may be identically applied to the third aspect of the present disclosure, even though they are omitted hereinafter.

In an embodiment of the present disclosure, the supercapacitor electrode may have a capacitance of about 10 $mF/cm^2$ or more, but may not be limited thereto. For example, the supercapacitor electrode may have a capacitance of about 10 $mF/cm^2$ or more, about 11 $mF/cm^2$ or more, about 12 $mF/cm^2$ or more, or about 13 $mF/cm^2$ or more, but may not be limited thereto.

In an embodiment of the present disclosure, as the amount of nitrogen doped increases, a capacitance may increase, but may not be limited thereto.

In an embodiment of the present disclosure, the N-doped three dimensional carbon nanostructure may be prepared by a step of preparing a three dimensional porous polymer pattern; a step of solution-heating the three dimensional porous polymer pattern; and a step of calcining the solution-heated three dimensional porous polymer pattern with a nitrogen source to simultaneously perform carbonization and nitrogen doping so as to obtain an N-doped three dimensional carbon nanostructure, but may not be limited thereto.

In an embodiment of the present disclosure, the three dimensional porous polymer pattern may be formed by a process including: forming a photoresist layer by spin-coating a photoresist solution on a substrate; forming a three dimensional porous photoresist polymer pattern by irradiating a three dimensional interference pattern onto the formed photoresist layer by three dimensional interference lithography; and obtaining a three dimensional porous polymer pattern by performing a heat treatment to the substrate to which the three dimensional interference pattern is irradiated, washing the substrate, and developing the photoresist pattern, but may not be limited thereto.

In an embodiment of the present disclosure, the step of solution-heating the three dimensional porous polymer pattern may include dipping the three dimensional porous polymer pattern in a solution containing an organic solvent, followed by heat treatment, and then washing the solution remaining on the surface of the porous polymer pattern, but may not be limited thereto.

In an embodiment of the present disclosure, the solution-heating may be performed at a glass transition temperature of the polymer or higher, but may not be limited thereto.

In an embodiment of the present disclosure, the solution-heating may be performed at a temperature ranging from about 100° C. to about 200° C., but may not be limited thereto. For example, the solution-heating may be performed at a temperature ranging from about 100° C. to about 200° C., from about 100° C. to about 180° C., from about 100° C. to about 170° C., from about 100° C. to about 150° C., from about 100° C. to about 130° C., from about 130° C. to about 200° C., from about 130° C. to about 180° C., from about 130° C. to about 170° C., from about 130° C. to about 150° C., from about 150° C. to about 200° C., from about 150° C. to about 180° C., from about 150° C. to about 170° C., from about 170° C. to about 200° C., from about 170° C. to about 180° C., from about 180° C. to about 200° C., or from about 100° C. to about 130° C., but may not be limited thereto.

In an embodiment of the present disclosure, the organic solvent may not dissolve the polymer, but may not be limited thereto. For example, the organic solvent may include an organic solvent which has a relative energy difference (RED) number based on the Hansen solubility parameter with respect to the polymer is less than about 1.0, and may include hexadecane or silicone oil, but may not be limited thereto.

In an embodiment of the present disclosure, the three dimensional porous polymer pattern or the three dimensional carbon nanostructure may include three dimensionally arranged pores, but may not be limited thereto.

In an embodiment of the present disclosure, the calcining may be performed at a temperature ranging from about 700° C. or more, but may not be limited thereto. For example, the calcining may be performed at a temperature ranging about 700° C. or more, from about 700° C. to about 1,500° C., from about 700° C. to about 1,300° C., from about 700° C. to about 1,100° C., from about 700° C. to about 900° C., from about 900° C. to about 1,500° C., from about 900° C. to about 1,300° C., from about 900° C. to about 1,100° C., from about 1,100° C. to about 1,500° C., from about 1,100° C. to about 1,300° C., or from about 1,300° C. to about 1,500° C., but may not be limited thereto.

In an embodiment of the present disclosure, the nitrogen source may be used without limitation as long as it includes nitrogen, and may include, for example, a member selected from the group consisting of amines, imines, nitriles, pyrroles, diazoles, triazoles, pyridines, diazines, triazines, and derivatives thereof, but may not be limited thereto. For example, specifically, the nitrogen source may include melamine, ureas, pyridines, pyrroles, polyacrylonitriles, ethylene-diaminetetraacetic acid, ammonia, ammonium chloride, triethylamine, or diethylamine, but may not be limited thereto.

Hereinafter, the present disclosure will be explained in more detail with reference to Examples. However, the following Examples are illustrative only for better understanding of the present disclosure but do not limit the present disclosure.

EXAMPLES

Preparation of Three Dimensional Porous Polymer Pattern

A three dimensional porous polymer pattern (SU8) was obtained via 5-beam interference lithography. A negative type SU-8 photoresist was used as a photoresist. A photoresist solution was prepared by dissolving 10 wt % SU-8 photoresist and a photoinitiator (IRGACURE 261) in the amount of up to 2 wt % of the SU-8 in a γ-butyrolactone (GBL). The photoresist solution was spin-coated on a substrate to a uniform height, so that a photoresist layer having a uniform thickness of from 7 μm to 9 μm was formed. A three dimensional interference pattern was formed by irradiating a visible light of 532 nm using a top-cut four-sided prism onto an upper part of the substrate on which the photoresist layer was formed, and the three dimensional interference pattern was irradiated to the photoresist layer, so that a three dimensional photoresist pattern was formed. A three dimensional porous photoresist polymer structure was formed by irradiating a three dimensional interference pattern formed by overlapping four or more laser beams. The four beams possessed wavevectors of $k_0 = k\ (0, 0, 0)$, $k_1 = k\ (-0.36, 0, 0.93)$, $k_2 = k\ (0, -0.36, 0.93)$, $k_3 = k\ (0.36, 0, 0.93)$, and $k_4 = k\ (0, 0.36, 0.93)$, respectively. Herein, k is $2\pi/\lambda$ and λ is a wavelength of the laser beam (532 nm). The substrate to which the three dimensional interference complex pattern was irradiated was heat-treated at 65° C. and 95° C. for several minutes and dipped in a PGMEA solution and then washed with iso propanol to develop the photoresist pattern, so that the three dimensional porous polymer pattern having a wood-pile structure was obtained. The surface morphology of the prepared three dimensional porous polymer pattern was measured by a field emission scanning electron microscope (FESEM) (Hitachi, S-4700).

Figure 3:
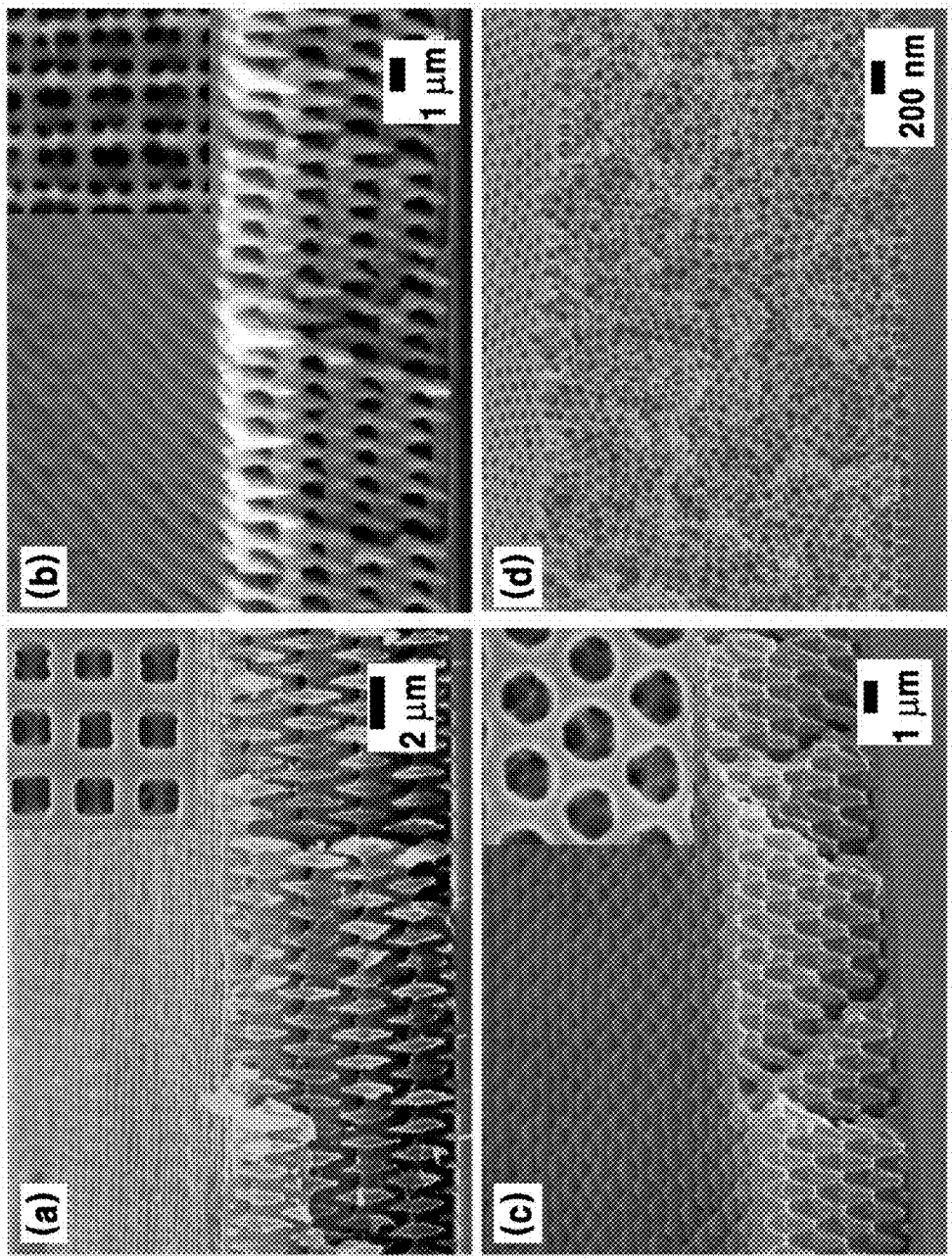
FIG. 3 shows electron microscope images of (a) a three dimensional porous polymer pattern formed by lithography, (b) a three dimensional porous polymer pattern formed by plasma etching, (c) a three dimensional porous polymer pattern formed by lithography and having FFC structure, and (d) a three dimensional porous polymer pattern formed by a silica (100 nm) template method in an example of the present disclosure.

The morphology of the prepared three dimensional porous polymer pattern SU8 can be controlled in various ways. FIG. 3 shows an electron microscope image of the formed morphology. The polymer may be etched by widening pores of the three dimensional porous polymer pattern. The polymer may be etched by a plasma etching method, and the thickness of the polymer can be controlled by controlling an etching time. The three dimensional porous polymer pattern was etched to have a minimum polymer thickness (about 20 nm) at which the structure can be maintained, so that a wood-pile three dimensional porous polymer pattern with a thin skeleton was prepared. Also, a three dimensional porous polymer pattern with a face-centered-cubic (FCC) arrangement can be prepared by controlling the angle of interference of the laser beams. In order to control a pattern morphology and a pore size in various ways, a method of injecting the photoresist using silica nanoparticles as a template and then removing the template was employed. In this case, the pore size can be controlled in various ways by controlling the size of the silica nanoparticles. Even if the three dimensional porous pattern having various morphologies such as the wood-pile pattern, the wood-pile pattern with a thin skeleton, and the FCC pattern has small pores or a thin skeleton, a crosslinking degree of the polymers can be increased by using the solution-heating of the present disclosure, so that the three dimensional polymer pattern can be carbonized while the morphology of the three dimensional polymer pattern is maintained. Thus, a three dimensional carbon nanostructure can be obtained.

Solution-Heating of Three Dimensional Porous Polymer Pattern

If the three dimensional porous polymer pattern formed using the photoresist is carbonized through a high-temperature heat-treatment, the structure cannot be maintained at a glass transition temperature of the polymer or higher but collapses, i.e., the pattern collapses. In order to lower the surface energy of the photoresist pattern during thermal crosslinking occurring in carbonization, solution-heating was employed.

Young's equation describes the surface energy difference of a solid substrate between air and liquid environments;

$$\gamma_s = \gamma_{si} + \gamma_i \cos \theta \qquad (1)$$

Herein, $\gamma_s$ and $\gamma_{si}$ are the surface energy of the solid substrate in a pure state and a wetting state by a solution, respectively, $\gamma_i$ is the solution surface energy, and $\theta$ is the contact angle (herein, the contact angle of the solution on the SU8 photoresist film was measured with a contact angle goniometer (Phoenix 300, Surface Electro Optics)). From a partial to complete wetting state, the term $\gamma_i \cos \theta$ is constantly positive, and, thus, $\gamma_{si}$ is smaller than $\gamma_s$. This implies that the surface energy of solid substrates can be lowered as long as they can be wetted by a solution; and increased wetting or wetting by a high-surface-energy solution can greatly lower the solid surface energy. That is, a heat-treatment in a solution that wets the three dimensional porous polymer pattern relieves the surface energy of the three dimensional porous polymer pattern and subsequently may retard its collapse during thermal crosslinking. Meanwhile, other requirements for the solution are that it should not be compatible with the polymer; otherwise the solution can swell or dissolve the polymer, which will thereby allow easy flowing upon heating. Moreover, the solution should have a boiling point (b.p.) high enough for the thermal crosslinking to be conducted at a high temperature.

Figure 4:
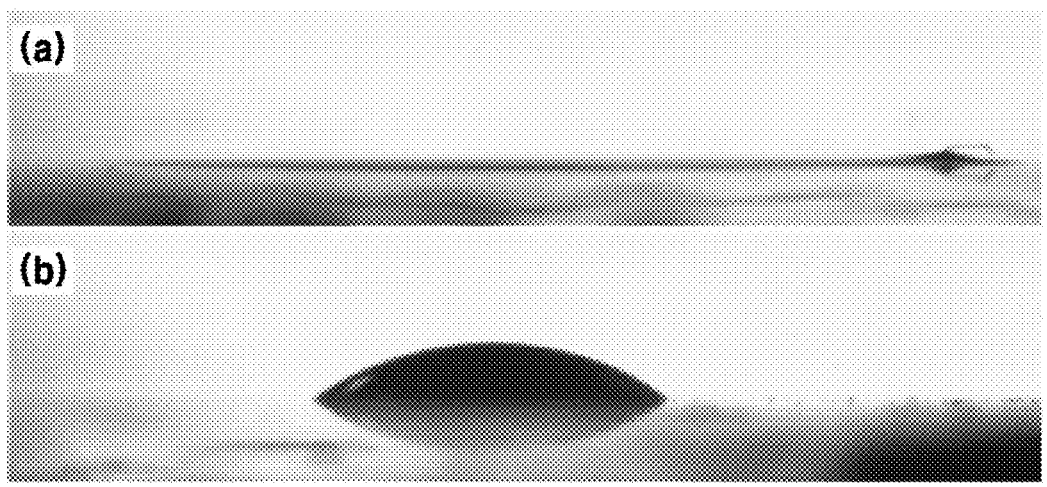
FIG. 4 shows digital camera images of (a) a hexadecane droplet on an SU8 film and (b) a triethylene glycol droplet on an SU8 film in an example of the present disclosure.

In the present disclosure, hexadecane was selected as an organic solvent of the solution for solution-heating. Hexadecane is one of solutions having a slightly high boiling point (b.p.: 290° C.). As shown in FIG. 4(a), hexadecane completely wetted the SU8 surface. Hexadecane is a non-polar solvent and thus not compatible with the SU8. A more accurate estimation of compatibility can be obtained by evaluating the relative energy difference (RED) number based on the Hansen solubility parameter, as shown in the following Table 1. For example, a RED value less than 1.0 indicates high affinity and a higher RED (i.e., >1.0) indicates lower affinity. Hexadecane clearly showed non-compatibility with the SU8. For comparison, triethylene glycol (b.p.: 285° C.), which is a solvent having a similar high boiling point, was tested. Triethylene glycol is an organic solvent capable of dissolving the SU8 polymer, so that the structure can be dissolved in the organic solvent during the solution-heating. Thus, as shown in FIG. 4(b), triethylene glycol partially wetted the SU8. However, triethylene glycol is a high-polarity solution. Based on its RED number, it can be seen that triethylene glycol is more compatible with the SU8 than hexadecane.

TABLE 1

|  | $\delta_d$ | $\delta_p$ | $\delta_h$ | $R_0$ | $R_\alpha$ | RED |
|---|---|---|---|---|---|---|
| SU8 | 18.1 | 11.4 | 9 | 9.1 |  |  |
| Hexadecane | 16.3 | 0 | 0 |  | 14.96 | 1.6 |
| Triethylene glycol | 16 | 12.5 | 18.6 |  | 10.53 | 1.1 |

Figure 5:
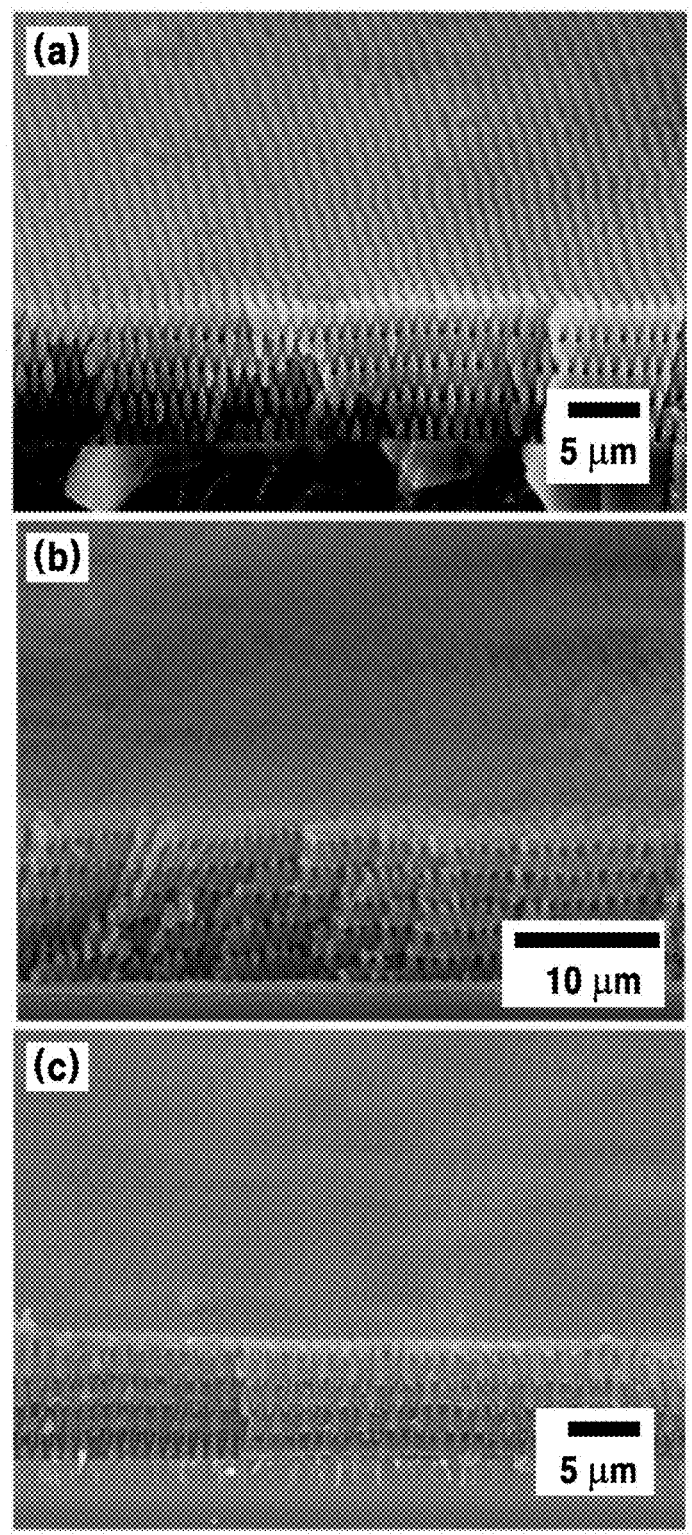
FIG. 5 shows electron microscope images of (a) a three dimensional porous polymer pattern without solution-heating, (b) a three dimensional porous polymer pattern with solution-heating in a hexadecane solution, and (c) a three dimensional porous polymer pattern with solution-heating in triethylene glycol (TEG) in an example of the present disclosure.

The solution-heating was performed by dipping the three dimensional porous polymer pattern in a solution (hexadecane or triethylene glycol) having normal temperature and then transferring the three dimensional porous polymer pattern to a solution having a high temperature, followed by heat treatment for 30 minutes. The solution used in this case has a temperature of 200° C. After the solution-heating, the solution remaining on the surface was washed with iso propanol, so that a three dimensional porous polymer pattern improved in crosslinking degree was obtained. FIG. 5 provides electron microscope images of (a) a three dimensional porous polymer pattern without solution-heating, (b) a three dimensional porous polymer pattern with solution-heating in a hexadecane solution, and (c) a three dimensional porous polymer pattern with solution-heating in triethylene glycol (TEG). Triethylene glycol is an organic solvent capable of dissolving the SU8 polymer used as a photoresist, so that the structure can be dissolved in the solvent during the solution-heating. Therefore, in consideration of solubility, an organic solvent applicable to a high-temperature heat treatment without dissolving polymer needs to be employed as a solution.

Analysis of Characteristics

Figure 6:
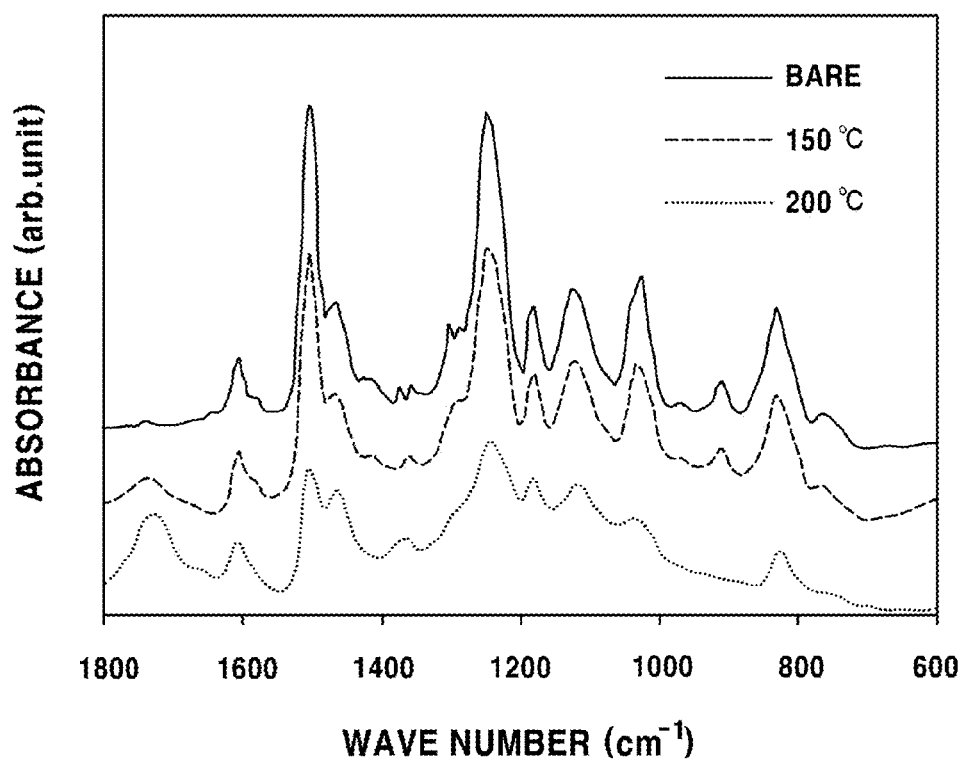
FIG. 6 is a graph showing the FT-IR results of SU8 films with solution-heating at 150° C. and 200° C. or without solution-heating (bare) in an example of the present disclosure.
Figure 7:
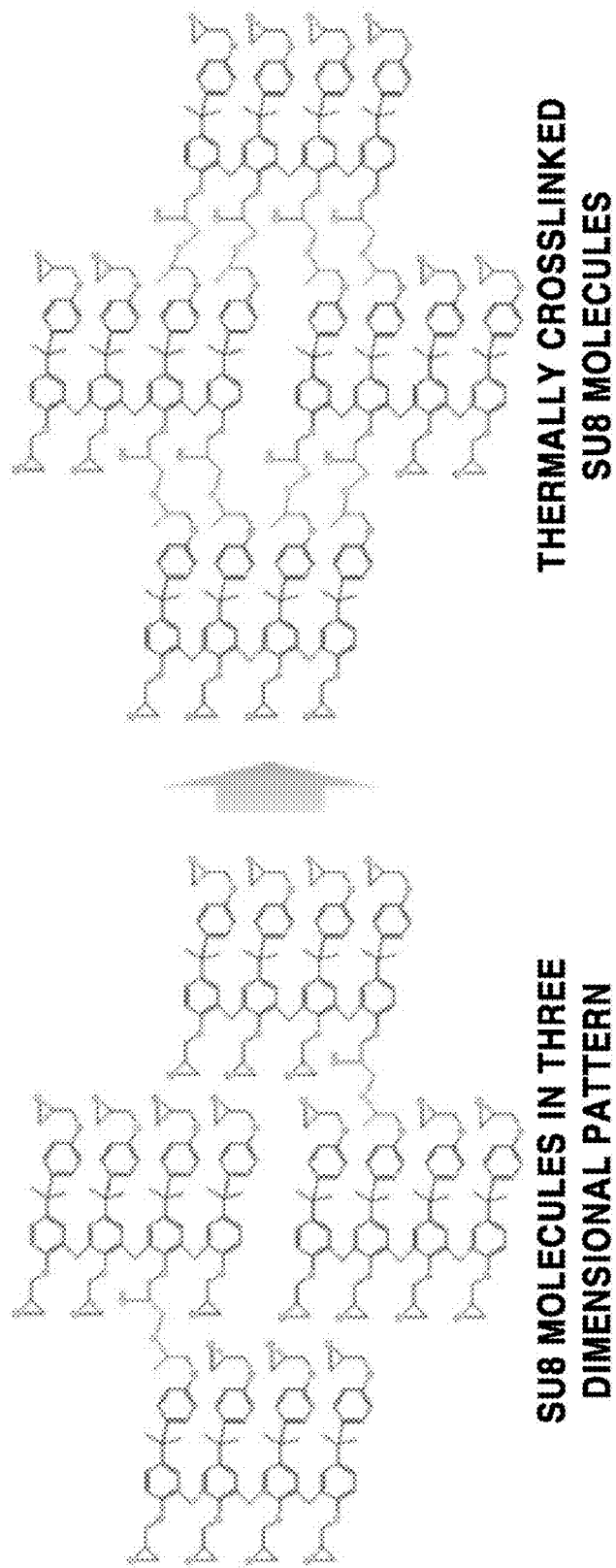
FIG. 7 is a schematic diagram illustrating a crosslinking reaction occurring in a three dimensional porous polymer pattern during solution-heating in an embodiment of the present disclosure.

To check a crosslinking degree of the polymer before and after the solution-heating, FT-IR was evaluated. FT-IR spectra were measured using a Nicolet FT-IR spectrometer. FIG. 6 shows the FT-IR results of the three dimensional porous polymer pattern without solution-heating and three dimensional porous polymer patterns respectively heat-treated at 150° C. and 200° C. The spectra were normalized to a peak of an aromatic ring at 1608 cm$^{-1}$ since this group constitutes the backbone of the SU8 monomers. The peaks at 910 cm$^{-1}$, 840 cm$^{-1}$, and 1250 cm$^{-1}$ were categorized as an epoxide group. In the SU8 molecules, the peaks at 840 cm$^{-1}$ and 1250 cm$^{-1}$ were overlapped with para-substituted aromatic ring and aromatic ether band, respectively. Therefore, the peak at 910 cm$^{-1}$ can be considered as a characteristic peak of the epoxide group in the SU8. In FIG. 6, the peak at 910 cm$^{-1}$ was not observed in the spectrum after the hexadecane solution-heating. Both the 840 cm$^{-1}$ and 1250 cm$^{-1}$ peaks also decreased during the heat treatment. That is, as a heat-treatment temperature increased, the peaks (840 cm$^{-1}$, 910 cm$^{-1}$, and 1250 cm$^{-1}$) corresponding to an epoxy group tended to decrease compared with the pattern without a heat treatment, which means that the opening of the epoxy group included in the SU8 induced crosslinking. Aliphatic ether peaks (1050~1150 cm$^{-1}$) produced by the epoxy crosslinking were not remarkable; this may be because these peaks were overlapped with the C—H in-plane bending of the aromatic rings (1020~1200 cm$^{-1}$). Meanwhile, a carbonyl peak appeared at 1730 cm$^{-1}$, whereas an aromatic ether peak (1250 cm$^{-1}$) and aliphatic ether peaks (1050~1150 cm$^{-1}$) decreased. This implies that some ether groups decomposed into the carbonyl group during the heat treatment. That is, the crosslinking degree of the three dimensional porous polymer pattern can be increased effectively by using the solution-heating. The crosslinking reaction of the SU8 caused by the solution-heating was as shown in the schematic diagram of FIG. 7.

Figure 8:
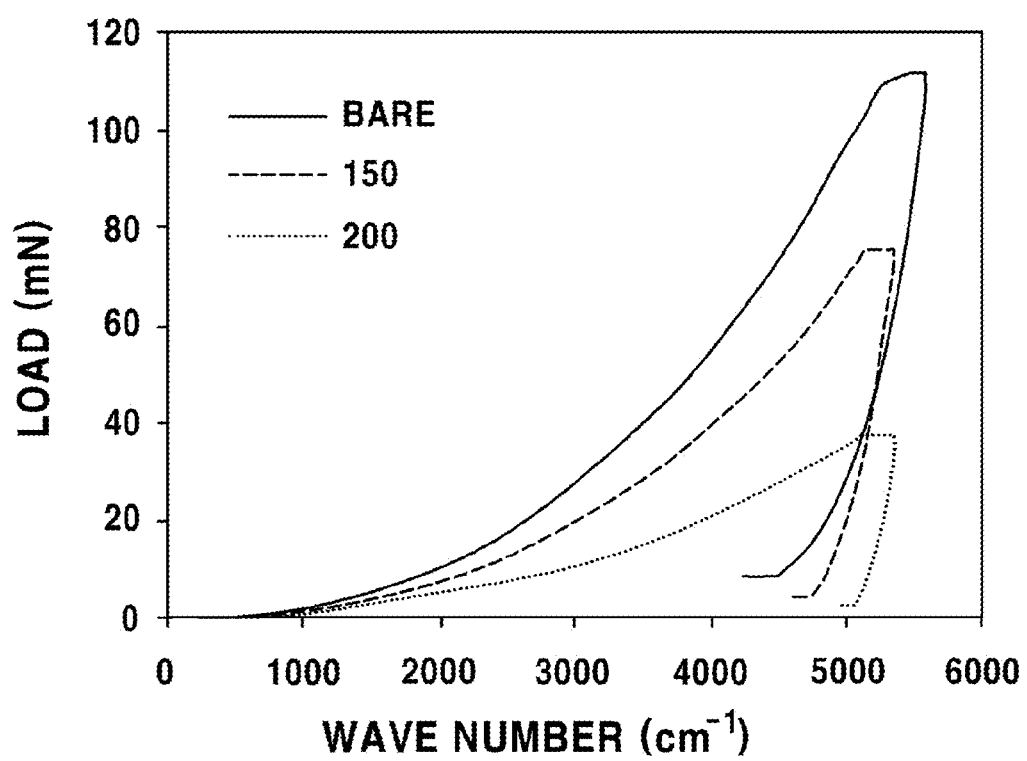
FIG. 8 is a graph showing the result of evaluation of mechanical properties of a solution-heated three dimensional porous polymer pattern in an example of the present disclosure.

To check improvement in crosslinking degree of the polymer through the solution-heating, a mechanical strength of the three dimensional porous polymer pattern was measured using a nanoindenter before and after the heat treatment (FIG. 8). The nanoindenter was performed using an MTS XP (MTS systems corporation), and an indenter tip (Berkovich type triangular pyramid) was loaded and run in a depth-controlled mode. The mechanical strength of the polymer was compared between the pattern without a heat treatment and the patterns treated with the solution controlled to 150° C. and 200° C., respectively. It was confirmed that compared with the polymer without a heat treatment, the polymer after the solution-heating was increased in mechanical strength. Also, as the solution-heating temperature increased, the mechanical strength of the polymer increased. Accordingly, it was confirmed that the crosslinking degree was improved.

Preparation of Three Dimensional Carbon Nanostructure

Figure 9:
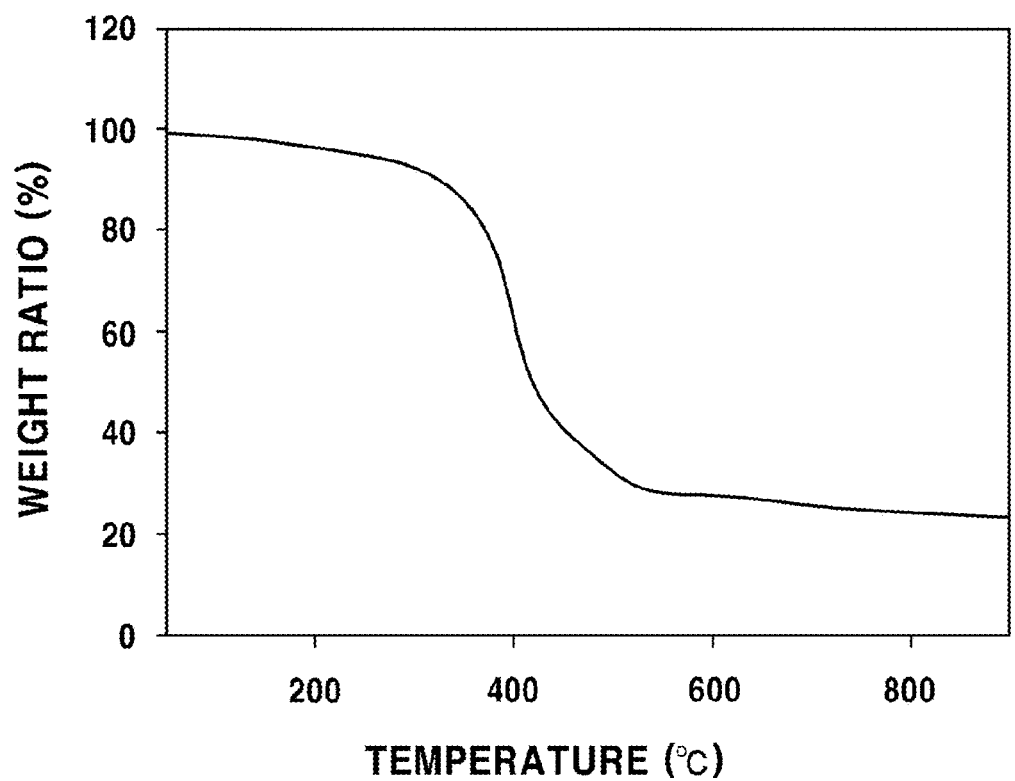
FIG. 9 is a graph showing the result of thermogravimetric analysis of a three dimensional porous polymer pattern (SU8) in an example of the present disclosure.
Figure 10:
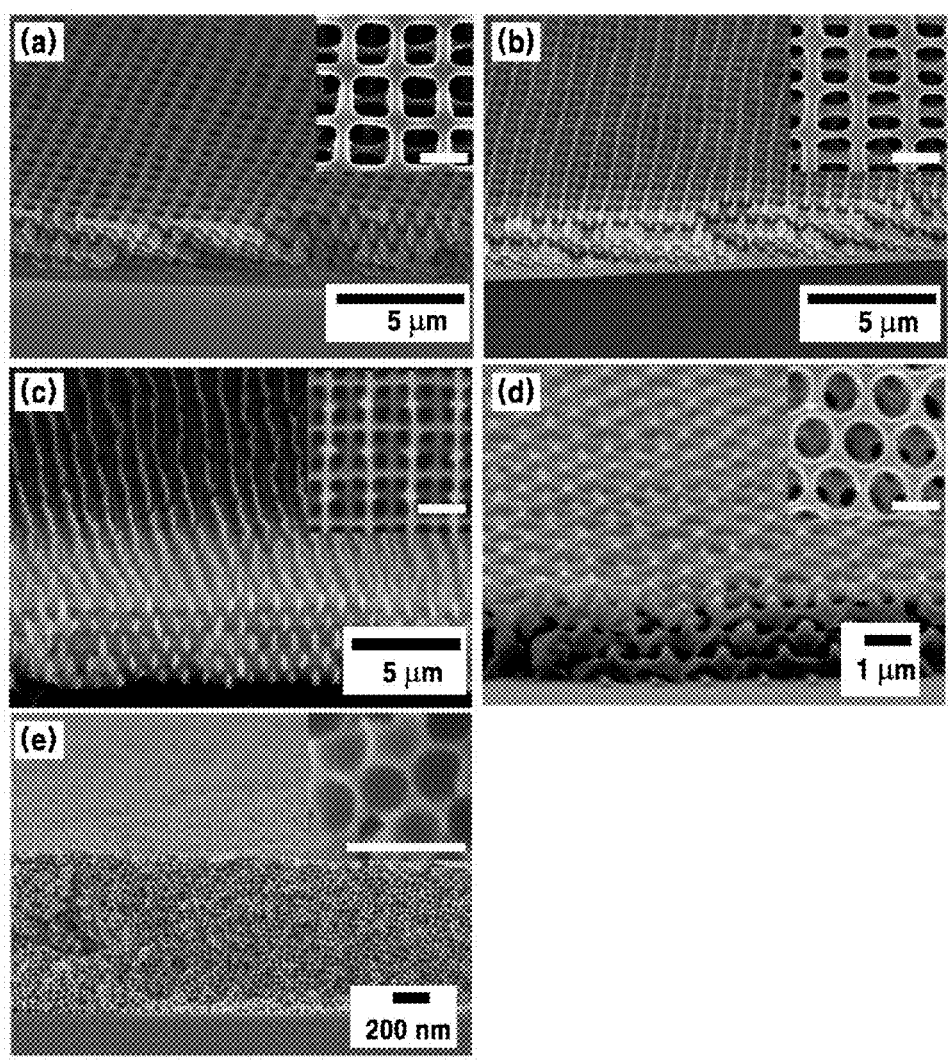
FIG. 10 shows electron microscope images of three dimensional carbon nanostructures with various morphologies (a) to (e) including (a) a three dimensional carbon nanostructure formed by lithography, (b) a three dimensional carbon nanostructure formed by lithography, (c) a three dimensional carbon nanostructure formed by plasma etching, (d) a three dimensional carbon nanostructure formed by lithography and having FFC structure, and (e) a three dimensional carbon nanostructure formed by a silica (100 nm) template method in an example of the present disclosure.

After the solution-heating, a change in mass of the SU8 polymer during a high-temperature carbonization process was analyzed via TGA (FIG. 9). The thermogravimetric analysis (TGA) was measured by heating the sample up to 900° C. in a nitrogen atmosphere, with a heating rate of 4° C./min (TA instrument TGA Q50). During calcination up to 900° C., the SU8 was decomposed except for about 25% of the initial mass. Therefore, during the calcination, the shrinkage of the pattern occurred. The three dimensional porous polymer pattern improved in crosslinking degree by the solution-heating was carbonized under the temperature conditions of 700° C. and 900° C. FIG. 10 shows electron microscope images of the carbonized three dimensional porous polymer patterns. It can be seen that the morphology of the three dimensional porous polymer pattern formed by lithography is well maintained after the carbonization and any difference in morphology depending on the calcination temperatures of 700° C. and 900° C. is not observed. As for the three dimensional porous polymer pattern having a wood-pile structure with a thin skeleton, after solution-heating followed by carbonization, a three dimensional carbon nanostructure with a constant thickness of several tens of nanometers can be obtained. It was confirmed that a three dimensional carbon nanostructure having an FCC structure can be obtained and a three dimensional structure including very small pore structures can also be obtained as carbon using a silica template. Therefore, the solution-heating can be applied to various structures regardless of a pore size or a polymer thickness, and, thus, a three dimensional carbon nanostructure can be obtained.

Analysis of Characteristics

Figure 11:
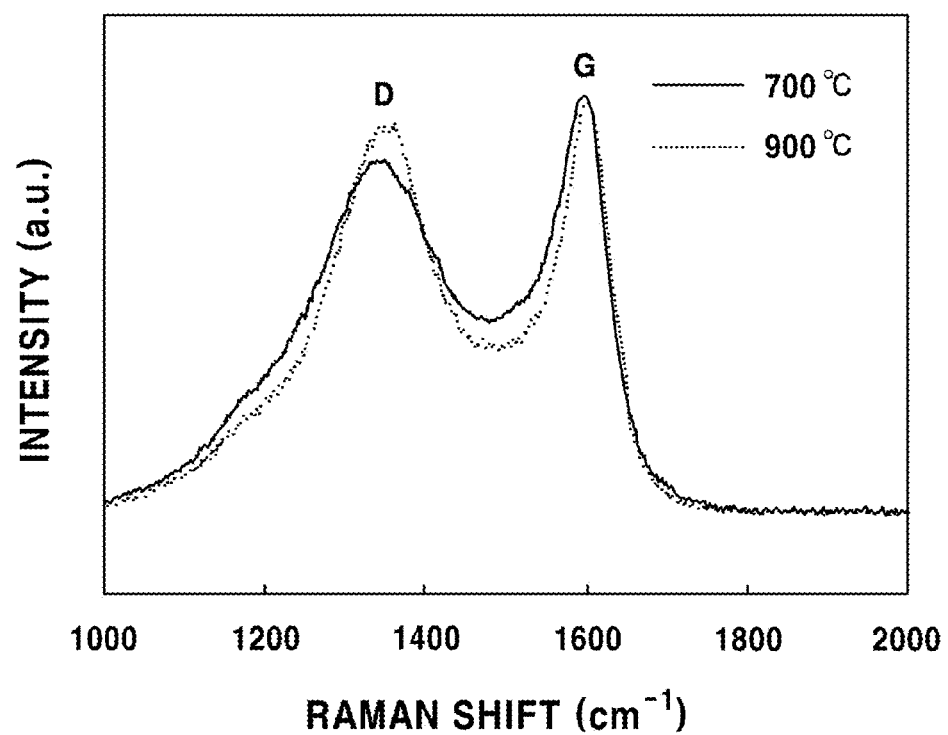
FIG. 11 is a graph showing Raman spectra of three dimensional carbon nanostructures carbonized at 700° C. and 900° C., respectively, in an example of the present disclosure.

The Raman spectra of three dimensional carbon nanostructures obtained by solution-heating and carbonization at 700° C. and 900° C., respectively, were evaluated (FIG. 11). Raman spectra were recorded using micro Raman spectroscope (Tokyo instrument, Nanofinder) with an excitation wavelength of 487.55 nm. FIG. 11 shows Raman spectra of three dimensional carbon nanostructures prepared at 700° C. and 900° C., respectively. Two characteristic peaks appeared at approximately 1590 $cm^{-1}$ and 1340 $cm^{-1}$ under visible excitation from the carbonaceous materials; the former represented the $E_{2g}$ symmetry mode (often labelled G mode as in graphite) and the latter appeared from the $A_{1g}$ symmetry of disordered graphite (designated as D mode). Also, the spectra show the shoulder peaks around 1180 $cm^{-1}$ and 1500 $cm^{-1}$, which have been designated as the contribution from $sp^3$ carbon. The similar intensities of D and G peaks of the three dimensional carbon nanostructures in FIG. 11 have been often observed in polymer-derived carbon that possess microcrystalline graphite characteristics. Specifically, as the carbonization temperature increased, the shoulder peaks decreased while the D peak increased. This result indicates that more graphite domains are created by the conversion of amorphous $sp^3$ carbon at a higher temperature. That is, it can be seen that the three dimensional carbon nanostructures have amorphous crystalline structures.

Figure 12A:
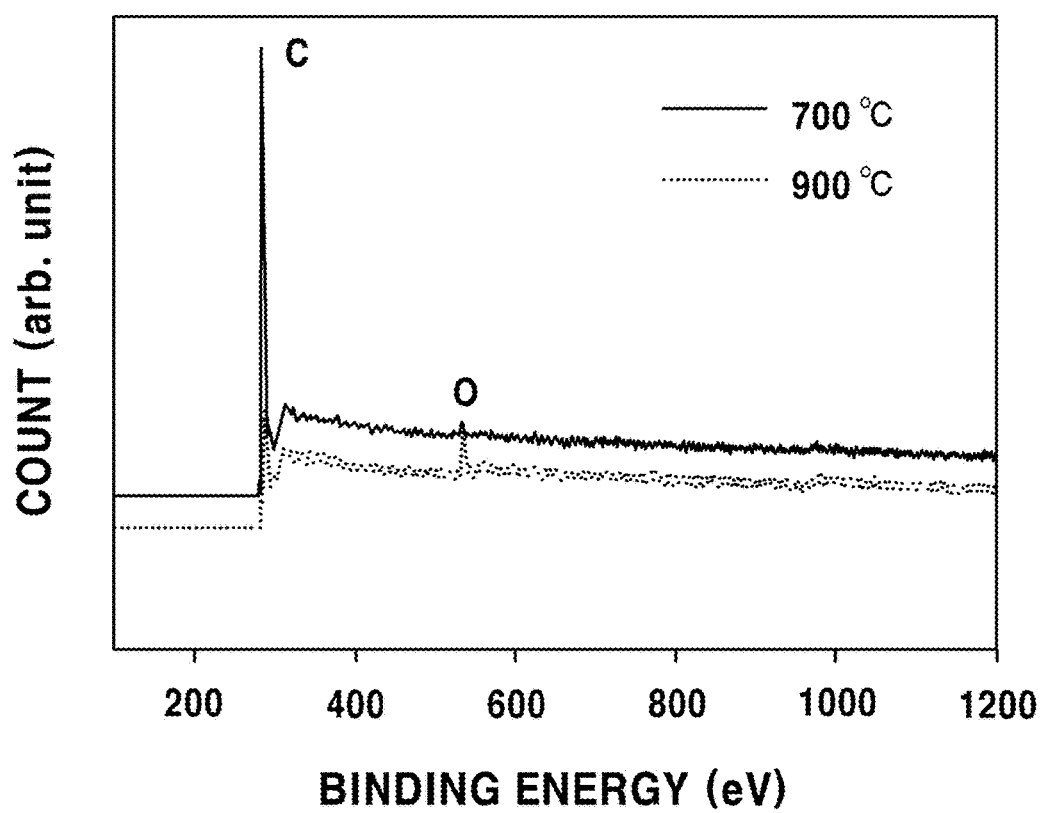
FIG. 12A to FIG. 12C shows (A) the XPS analysis results of three dimensional carbon nanostructures obtained under calcination conditions of 700° C. and 900° C., respectively, (B) C is spectra of three dimensional carbon nanostructures obtained under calcination conditions of 700° C., and (C) C is spectra of three dimensional carbon nanostructures obtained under calcination conditions of 900° C. in an example of the present disclosure.
Figure 12B:
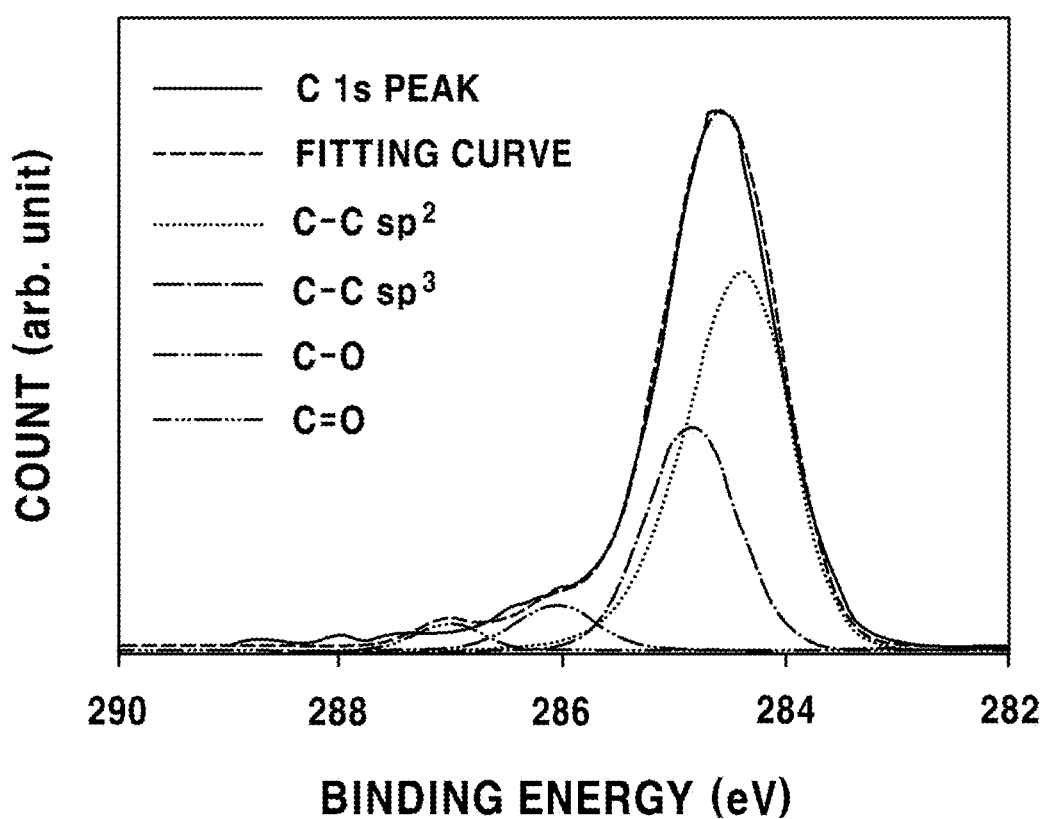
Figure 12C:
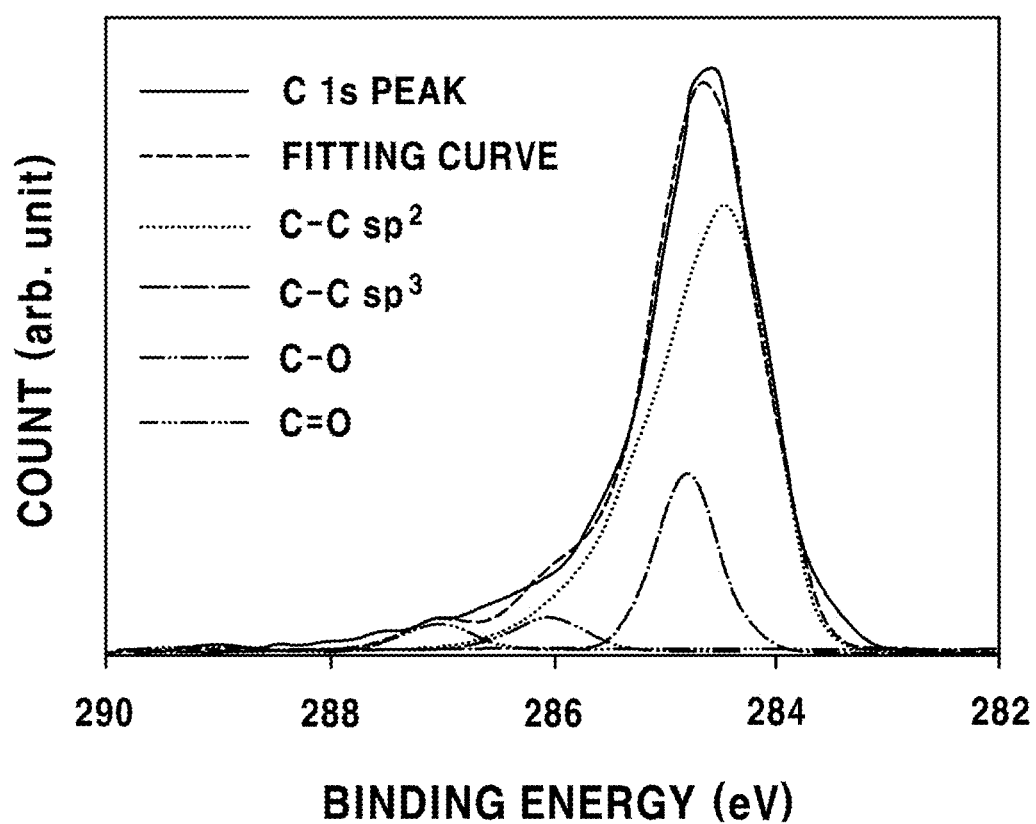

X-ray photoelectron spectroscopy (XPS) was performed to clearly analyze a crystalline structure of the three dimensional porous polymer pattern depending on a carbonization temperature. FIG. 12 shows various chemical compositions of the three dimensional carbon nanostructures via C is peaks. The oxygen content for each sample was about 3 at %. Since the atomic percent of oxygen in the SU8 was measured as being higher by about 18 at % than the carbon content, most of the oxygenated groups were removed during carbonization. FIG. 12(b) and FIG. 12(c) show C is peaks from three dimensional carbon nanostructures prepared at 700° C. and 900° C., respectively. The peak was deconvoluted into four peaks at different binding energies: $sp^2$ C—C bonding at from 284.3 eV to 284.6 eV, $sp^3$ C—C bonding at from 284.8 eV to 285.1 eV, C—O bonding at from 285.5 eV to 286.0 eV, and C=O bonding at from 287.0 eV to 288.1 eV. The $sp^2$ peak was fitted by an asymmetric Lorentzian function, and the others were fitted by Gaussian peaks. Comparing the area ratios of the $sp^2$ and $sp^3$ atomic contents, the three dimensional carbon nanostructures prepared at a high temperature exhibited a $sp^2$ content higher than a $sp^3$ content, which was consistent with the Raman analysis. The electrical conductivity of the wood-pile carbon nanostructures was measured via 4-point probe analysis. The conductivity value of the three dimensional carbon nanostructure prepared at 900° C. was about $3.9 \times 10^3$ S/m, which was several tens of times higher than the carbon prepared at 700° C. The high conductivity for the three dimensional carbon nanostructure prepared at 900° C. may be attributed to high content of $sp^2$ bonding. As shown in the following Table 2, chemical composition ratios depending on a calcination temperature were compared. It was confirmed that as the calcination temperature increased, a ratio of $sp^3$ in carbon bonding decreased but $sp^2$ bonding increased. That is, a crystalline structure of carbon can be controlled depending on a calcination temperature.

TABLE 2

| Chemical bonding | Atomic % (at. %) | |
|---|---|---|
| | 700° C. | 900° C. |
| C—C, $sp^2$ | 54.3-64.4 | 65.4-70.9 |
| C—C, $sp^3$ | 24.9-36.3 | 20.1-26.1 |
| C—O | 6.6-7.8 | 4.8-6.2 |
| C=O | 1.6-3.9 | 3.6-3.7 |

Figure 13:
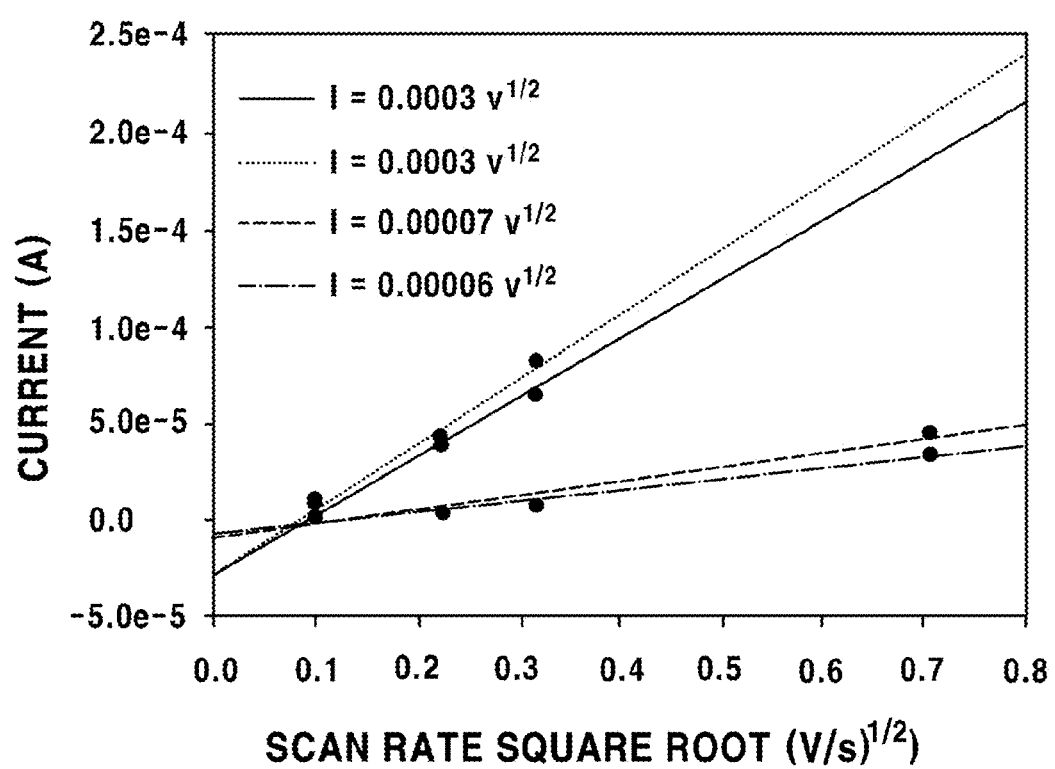
FIG. 13 is a graph comparing three dimensional carbon nanostructures in terms of electrochemical active surface area in an example of the present disclosure. In the graph, a black line represents a carbon film without a pore, a green line represents a three dimensional carbon nanostructure calcined at 700° C. without solution-heating, a red line represents a three dimensional carbon nanostructure calcined at 700° C. after solution-heating, and a blue line represents a three dimensional carbon nanostructure calcined at 900° C. after solution-heating.

In FIG. 13, a carbon film without including pores, carbon calcined without solution-heating and three dimensional carbon nanostructures calcined at 700° C. and 900° C., respectively, after solution-heating were compared in terms of surface area. The gradient of the graph obtained via cyclic voltammetry (CV) is proportional to an electrochemical active surface area according to the Randles-Sevcik approach. Thus, it can be seen that carbon calcined without solution-heating has an electrochemical active surface area equivalent to that of the carbon film without including pores. The three dimensional carbon nanostructures obtained via solution-heating followed by calcination has an electrochemical active surface area which is about 4 times higher than carbon without including pores, and the surface area is not affected by a calcination temperature but remains.

Figure 14:
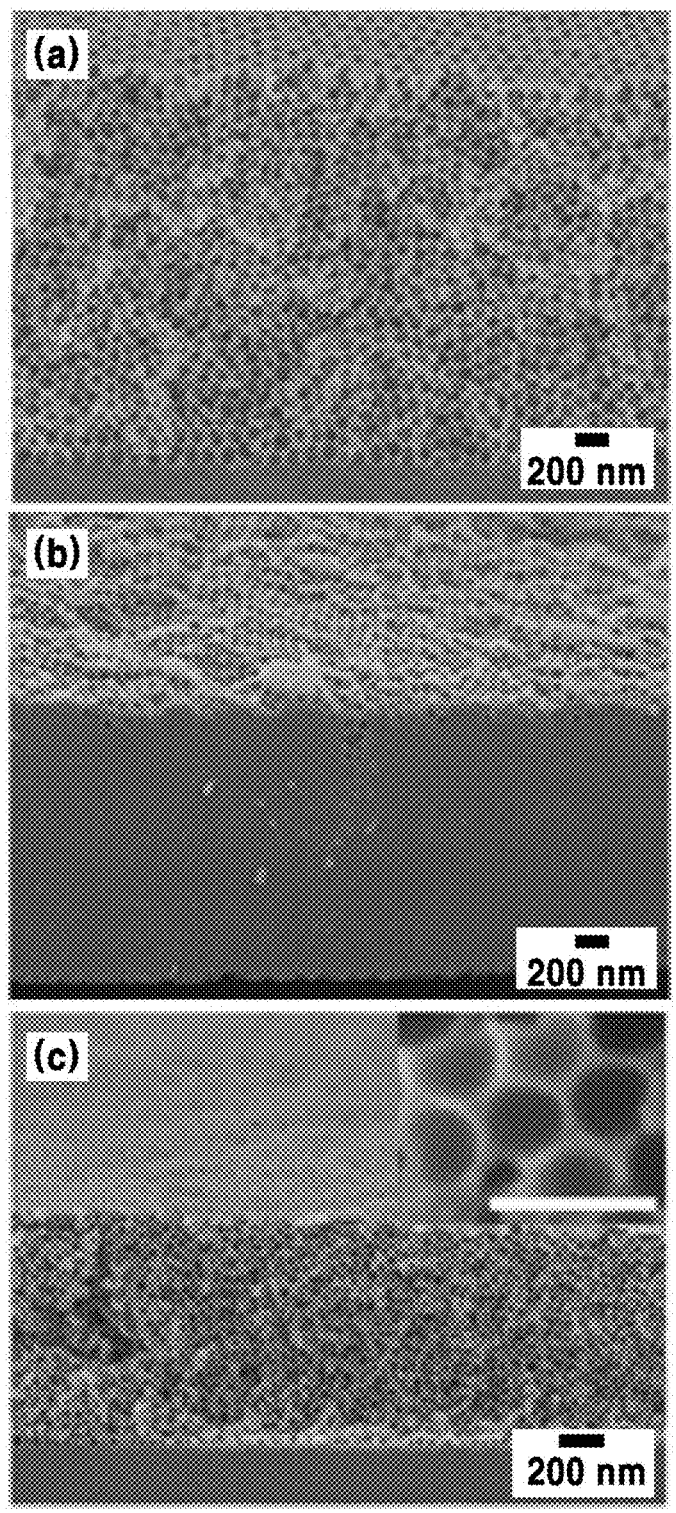
FIG. 14 shows electron microscope images of (a) a three dimensional carbon nanostructure formed using a silica support, (b) a three dimensional carbon nanostructure carbonized without solution-heating, and (c) a three dimensional carbon nanostructure carbonized after solution-heating in an example of the present disclosure.

The solution-heating can also be applied to a polymer material including smaller pore structures. FIG. 14 shows electron microscope images of a polymer film including pores having a size of about 100 nm. The polymer film including small pores was prepared by forming a layer using silica particles having a uniform size, injecting an SU8 solution into a silica template, and removing the silica template using hydrofluoric acid (HF). It was confirmed that the small pore structures of the polymer film could not be maintained due to the shrinkage during carbonization of the polymer in case of calcination without solution-heating. However, in case of calcination after solution-heating, a porous carbon film in which small pore structures having a size of about 80 nm are well maintained can be formed.

Preparation of N-Doped Three Dimensional Carbon Nanostructure

In carbonization of the solution-heated three dimensional porous polymer pattern (under an argon gas at 700° C.), melamine (Sigma Aldrich) as a nitrogen source was added at a mass ratio of more than 10:1 to relative to the polymer pattern and then carbonized, so that an N-doped three dimensional carbon nanostructure was obtained. A nitrogen content of the three dimensional carbon nanostructure doped with nitrogen after the solution-heating was checked as compared with a carbon nanostructure obtained by nitrogen doping through an inorganic layer via the conventional chemical vapor deposition method and. If the solution-heating is used, nitrogen doping does not occur through the inorganic layer, but occurs directly on the surface of the polymer. Therefore, after the doping, a ratio of nitrogen to carbon is improved by 60%. Also, the polymer pattern obtained via the solution-heating has excellent retention of the structure during carbonization. Therefore, in the CVD method, a nitrogen heat treatment is needed after carbonization, whereas in the solution-heating, carbonization and nitrogen doping can be performed through a single heat treatment.

Preparation of Supercapacitor

Figure 15A:
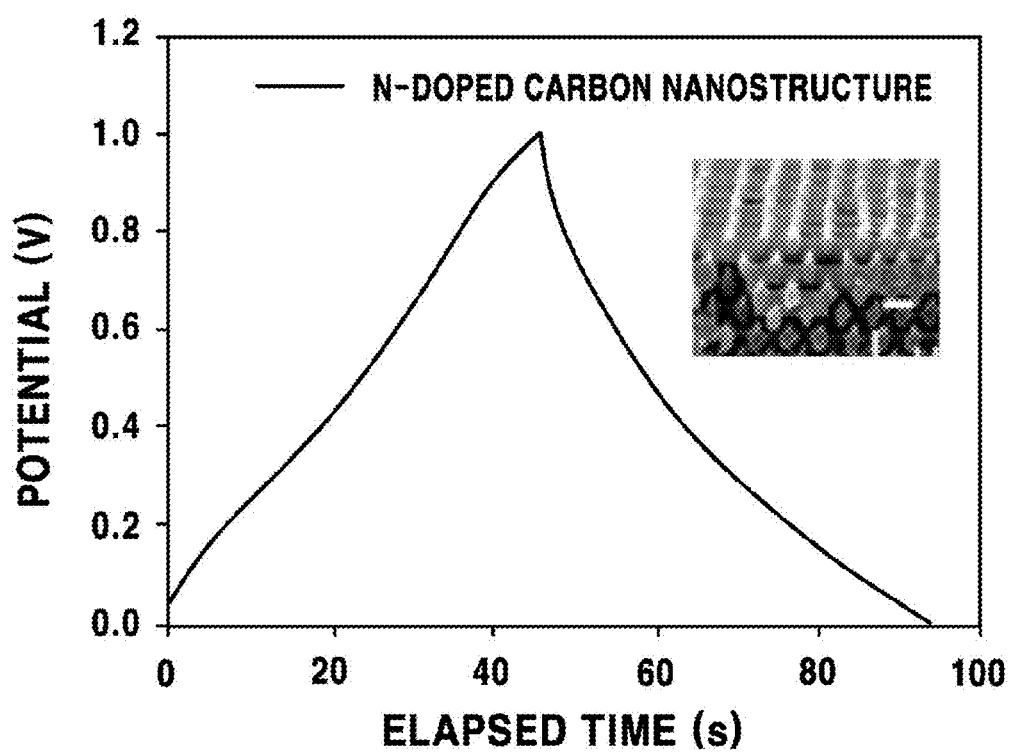
FIG. 15A to FIG. 15C shows (A) a charging/discharging curve of a carbon nanostructure doped with nitrogen via solution-heating using 1 M $H_2SO_4$ as an electrolyte at a current density of 1 $mA/cm^2$, (B) specific capacitances at various current densities, and (C) a capacitance retention over charging/discharging cycles at a current density of 1 $mA/cm^2$ in an example of the present disclosure.
Figure 15B:
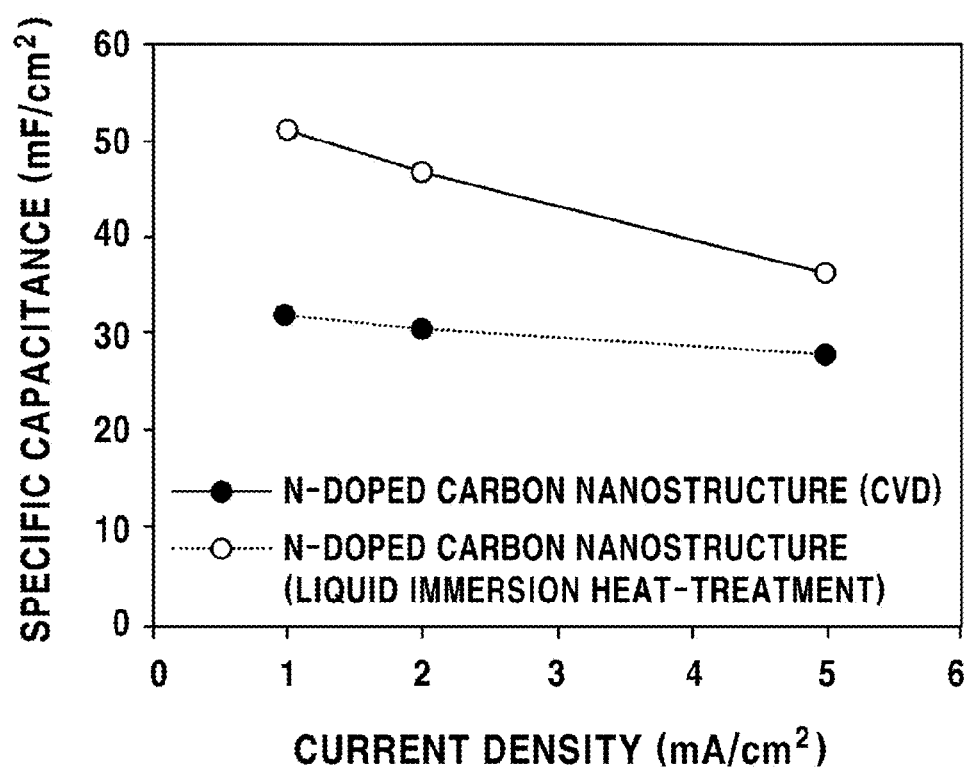
Figure 15C:
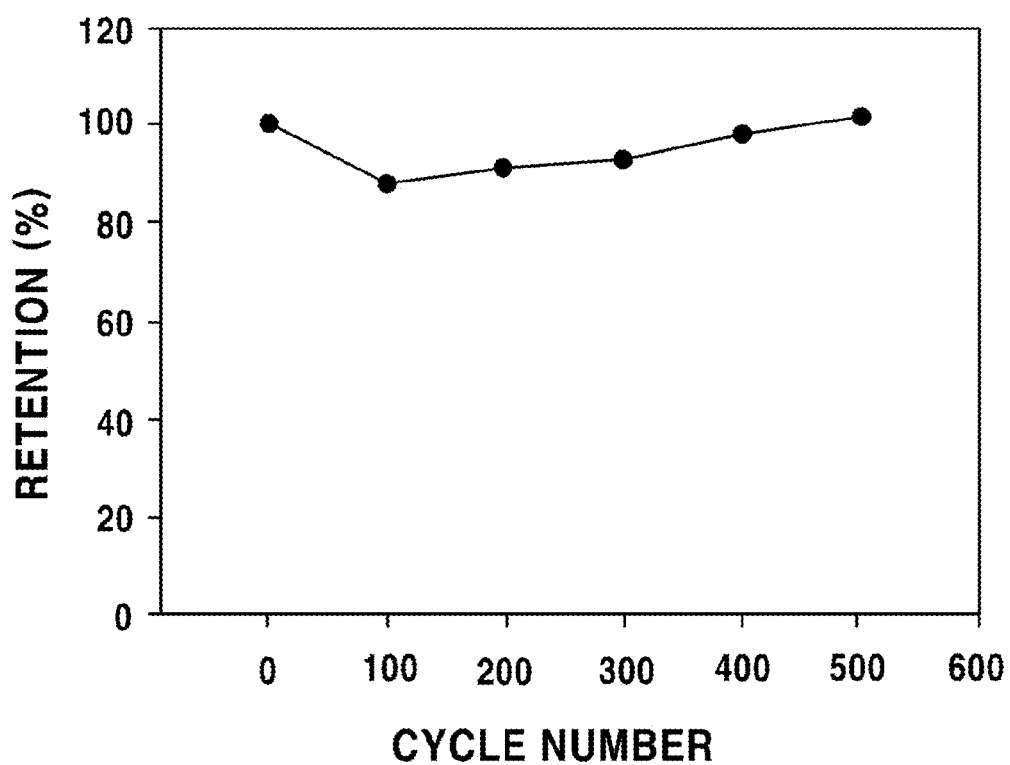

The N-doped three dimensional carbon nanostructure was applied as an electrode for a supercapacitor, and then its electrochemical performance was evaluated (FIG. 15). As a result of evaluation of charging/discharging performance using three electrodes in a 1 M sulfuric acid ($H_2SO_4$) solution, the specific capacitance was estimated to be 52 $mF/cm^2$ at a current density of 1 $mA/cm^2$. This specific capacitance was 63% higher than that of the previous result. In contrast to the conventional approach where doping was achieved through a silica layer, direct doping of nitrogen into carbon matrix in carbonization after the solution-heating enhances a doping content, resulting in a higher specific capacitance. The specific capacitance at various current densities is shown in FIG. 15(b). As a result of evaluation of the specific capacitance while a current density was increased from 1 $mA/cm^2$ to 5 $mA/cm^2$, it was confirmed that the N-doped three dimensional carbon nanostructure maintained a capacitance improved by 63% as compared with the N-doped three dimensional carbon nanostructure implemented via CVD. The cycle performance was evaluated by the measurement of a capacitance over charging/discharging cycles as shown in FIG. 15(c). As a result of evaluation of capacitance retention during 500 cycles, the capacitance retention was maintained within 90% of the initial capacitance, which demonstrates the excellent cycle stability of the N-doped three dimensional carbon nanostructure as a supercapacitor electrode.

CONCLUSION

The present disclosure proves a novel and easy solution-heating strategy to crosslink three dimensional porous polymer patterns without inducing any pattern morphology change. The strategy is based on the relief of three dimensional porous polymer patterns' high surface energy by wetting the surface with a solution containing an organic solvent. On the basis of high boiling point, non-compatibility with the polymer, and wetting behavior, hexadecane was shown as a good candidate for this purpose. In contrast to the pore collapse of the three dimensional carbon nanostructure during a heat treatment in an air environment, solution-heating in hexadecane did not show this problem. The FT-IR and the mechanical modulus measurement clearly indicated the crosslinking of SU8 epoxide groups during the solution-heating. Moreover, it was observed that the solution-heated three dimensional porous polymer pattern was converted into a three dimensional carbon nanostructure with a high structural integrity; the skeleton of the polymer pattern became thin due to the pyrolytic decomposition during the carbonization. The Raman and XPS analysis revealed that a large portion of $sp^2$ carbon configuration was produced during the high-temperature carbonization. The three dimensional carbon nanostructure was applied as an electrode for a supercapacitor. The galvanostatic charging/discharging analysis revealed the specific capacitance of 52 $mF/cm^2$ at a current density of 1 $mA/cm^2$, specifically which was 63% higher than that of the previous study. This easy solution-heating technique to control interfacial energy is believed to be used for a heat treatment of various three dimensional porous polymer patterns with structural integrity. It can also be employed in processes such as thermal self-assembly and annealing of block copolymer patterning and hard-baking of MEMS patterns.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method of preparing an N-doped three dimensional carbon nanostructure having a nitrogen doping ratio of 10% or more for a supercapacitor electrode, the method comprising:
   a step of preparing a three dimensional porous polymer pattern by three dimensional optical interference lithography;
   a step of solution-heating the three dimensional porous polymer pattern; and
   a step of calcining the solution-heated three dimensional porous polymer pattern with a nitrogen source to simultaneously perform carbonization and nitrogen doping so as to obtain an N-doped three dimensional carbon nanostructure, wherein the step of solution-heating the three dimensional porous polymer pattern includes dipping the three dimensional porous polymer pattern in a solution containing an organic solvent, followed by heat treatment, and then washing the solution remaining on a surface of the porous polymer pattern, wherein the solution-heating is performed at a glass transition temperature of the polymer or higher, wherein the nitrogen source includes a member selected from the group consisting of amines, imines, nitriles, pyrroles, diazoles, triazoles, pyridines, diazines, triazines, and derivatives thereof, wherein a mass ratio of the nitrogen source is more than 10:1 relative to the porous polymer pattern, wherein the step of calcining is performed at a temperature of 700° C. or more, and the calcination temperature controls a nitrogen doping ratio or bonding of doped nitrogen, and the bonding of doped nitrogen includes one of pyridine-like, pyrrole-like, graphite-nitrogen, and nitrogen oxide, and wherein the supercapacitor electrode using the N-doped three dimensional carbon nanostructure has a capacitance of about 10 mF/cm$^2$ or more.

2. The method of preparing an N-doped three dimensional carbon nanostructure of claim 1, wherein the solution-heating is performed at a temperature ranging from 100° C. to 200° C.

3. The method of preparing an N-doped three dimensional carbon nanostructure of claim 1, wherein the three dimensional porous polymer pattern or the three dimensional carbon nanostructure includes three dimensionally arranged pores.

* * * * *